(12) United States Patent
Uln et al.

(10) Patent No.: US 8,868,124 B2
(45) Date of Patent: Oct. 21, 2014

(54) FREQUENCY DOMAIN EQUALIZER FOR A BEAMFORMED SYSTEM

(75) Inventors: Kiran Uln, Pleasanton, CA (US); Gary Anwyl, Palo Alto, CA (US); Thomas E. Pare, Jr., Mountain View, CA (US)

(73) Assignee: Mediatek Singapore Pte. Ltd. (SG)

( * ) Notice: Subject to any disclaimer, the term of this patent is extended or adjusted under 35 U.S.C. 154(b) by 0 days.

(21) Appl. No.: 13/599,970

(22) Filed: Aug. 30, 2012

(65) Prior Publication Data

US 2014/0064390 A1 Mar. 6, 2014

(51) Int. Cl.
*H04B 7/00* (2006.01)
*H04W 52/24* (2009.01)
*H04L 5/00* (2006.01)
*H04W 52/34* (2009.01)
*H04B 7/04* (2006.01)
*H04B 7/06* (2006.01)

(52) U.S. Cl.
CPC .............. *H04W 52/24* (2013.01); *H04L 5/006* (2013.01); *H04W 52/346* (2013.01); *H04B 7/0426* (2013.01); *H04B 7/0617* (2013.01)
USPC .......... 455/522; 455/103; 455/115.1; 370/318

(58) Field of Classification Search
CPC .... H04B 7/0426; H04B 7/0617; H04L 5/006; H04W 52/24; H04W 52/241; H04W 52/346
USPC ........ 455/522, 63.1, 65, 67.11, 67.13, 68, 69, 455/101, 102, 103, 115.1; 375/267, 296, 375/299; 370/318, 319, 329, 335
See application file for complete search history.

(56) References Cited

U.S. PATENT DOCUMENTS

| | | | |
|---|---|---|---|
| 6,751,187 B2 * | 6/2004 | Walton et al. ................. | 370/210 |
| 6,862,271 B2 * | 3/2005 | Medvedev et al. ............ | 370/329 |
| 8,094,625 B2 * | 1/2012 | Walton et al. ................. | 370/334 |
| 2004/0228283 A1 * | 11/2004 | Naguib et al. ................ | 370/252 |
| 2005/0099937 A1 * | 5/2005 | Oh et al. ....................... | 370/207 |
| 2006/0116155 A1 * | 6/2006 | Medvedev et al. ............ | 455/522 |
| 2007/0195907 A1 * | 8/2007 | Wang et al. ................... | 375/267 |
| 2008/0238775 A1 * | 10/2008 | Guo et al. ..................... | 342/377 |
| 2009/0046003 A1 | 2/2009 | Tung et al. | |
| 2010/0020757 A1 * | 1/2010 | Walton et al. ................. | 370/329 |
| 2010/0182198 A1 | 7/2010 | Wen et al. | |
| 2010/0189167 A1 | 7/2010 | Pare, Jr. et al. | |
| 2011/0026630 A1 * | 2/2011 | Stager et al. ................. | 375/267 |
| 2013/0058390 A1 * | 3/2013 | Haas et al. .................... | 375/224 |

* cited by examiner

*Primary Examiner* — Duc M Nguyen
(74) *Attorney, Agent, or Firm* — Sawyer Law Group, P.C.

(57) ABSTRACT

A method, system, and computer program product for beamforming in a wireless communication system is disclosed. The method, system, and computer program product comprise a plurality of transmit antennas for a transmitter and at least one receive antenna for a receiver. The method, system, and computer program product comprise: initiating beamforming on a communication channel between the plurality of transmit antennas and the at least one receive antenna. The communication channel includes two data streams. A received signal to noise ratio (SNR) on one of the two data streams is weaker than a received SNR of the other data stream. The method, system, and computer program product include reallocating the transmit power between the stronger stream and the weaker stream to provide improved channel performance.

10 Claims, 8 Drawing Sheets

Initiating beamforming on a communication channel between a plurality of transmit antennas and at least one receive antenna — 402

Providing at least two data streams on the communication channel in which the received SNR of one data stream is less than the received SNR of the other data stream — 404

Reallocating transmit power between a stronger stream and a weak stream to provide improved channel performance — 406

FREQUENCY DOMAIN EQUALIZER FOR A BEAMFORMED SYSTEM

FIELD OF THE INVENTION

The present invention relates generally to the field of wireless transmitters and receivers and particularly to a method and apparatus for antenna beamforming of a multi-input-multi-output (MIMO) transmitter and receiver using orthogonal frequency division multiplexing (OFDM).

BACKGROUND

Personal devices, such as computers, phones, personal digital assistants and the like have gained wide popularity in recent years. As technology improves, these devices have become increasingly smaller in size and highly portable. In fact, wireless, portable devices of various types now commonly communicate with one another allowing users flexibility of use and facilitating data, voice and audio communication. To this end, networking of mobile or portable and wireless devices is required.

With regard to the wireless networking of personal devices, a particular modem, namely modems adapted to the up-coming IEEE 802.11n and 802.11ac industry standard, are anticipated to be commonly employed. These and similar standards allow an array of antennas is placed inside or nearby the personal device and a radio frequency (RF) semiconductor device receives signal or data through the array and an analog-to-digital converter, typically located within the personal device, and converts the received signal to baseband range. Thereafter, a baseband processor is employed to process and decode the received signal to the point of extracting raw data, which may be files transferred remotely and wireless, from another personal device or similar equipment with the use of a transmitter within the transmitting PC.

To do so, pointing of the array of antennas, which is essentially multiple antennas, hence the name multi-input-multi-output (MIMO), to the desired location to maximize reception and transmission quality is an issue. For example, data or information rate throughput, signal reception and link range are improved. The latest IEEE802.11n/ac standards currently being developed include advanced multi-antenna techniques in order to process parallel data streams simultaneously in order to increase throughput capability, and improve link quality by "smartly" transmitting and receiving the RF signals.

There are two basic types of beamforming specified in the current 802.11n standard: explicit and implicit. For explicit beamforming the receiver measures the channel between the transmitter and receiver and sends this information, called channel state information or CSI, back to the transmitter. The transmitter can then use the channel information to calculate the best transmit "paths" or "directions" for that particular client for transmitting future packets. Using the CSI in this way is sometimes referred to as beamforming. While this method provides a direct measure of the channel for beamforming, it requires CSI to be sent over the link resulting in network overhead that can lead to reduced overall throughput.

The second basic method of beamforming, implicit beamforming, does not require CSI to be sent back to the transmitter on a packet-by-packet basis. Instead the implicit method relies on the principle of channel reciprocity. Channel reciprocity assumes that the upstream and downstream channels are essentially the same (to within a transpose operation and some trivial phase rotations), so that the receiver can use the measured channel information to beamform packets of information back to the transmitter. In this way, no explicit CSI is required to be sent over the link, thereby eliminating network overhead. The downside of implicit beamforming is that it requires a calibration procedure between the transmitter and receiver to ensure that reciprocity is achieved. The calibration procedure requires complex coordination between the access point (AP) and clients in which large amounts of CSI are periodically exchanged. An AP is a device that is wirelessly transmitting or receiving within a network of devices.

In a wireless channel, multi-path results in channel nulls. For an OFDM system, this would result in different tones having an SNR dependent on the channel strength. In a MIMO channel, there will be cross-correlation between the antennas (and transmitted streams). Depending on the type of receiver (ZF/MLD), it may result in loss of performance. Beamforming helps in removing this cross-correlation and reducing the cost of the receiver for optimal performance. However, the disparity between the streams and tones (within a stream) still exists and this affects performance.

Accordingly, what is desired is to provide a system and method that overcomes the above issues. The present invention addresses such a need.

SUMMARY OF THE INVENTION

A method, system, and computer program product for beamforming in a wireless communication system is disclosed. The method, system, and computer program product comprise a plurality of transmit antennas for a transmitter and at least one receive antenna for a receiver. The method, system, and computer program product comprise: initiating beamforming on a communication channel between the plurality of transmit antennas and the at least one receive antenna. The communication channel includes two or more data streams. A received signal to noise ratio (SNR) on one of the two data streams is weaker than a received SNR of the other data stream. The method, system, and computer program product include reallocating the transmit power between the stronger stream and the weaker stream to provide improved channel performance.

A system and method in accordance with the present invention provides scaled beamforming that equalizes the eigenmode, because (1) cross-correlation remains ~0; (2) ratio of eigen values ~1, (3) nulls are minimal; and (4) close performance range is improved. In addition, throughput stability is also increased.

DETAILED DESCRIPTION

The present invention relates generally to the field of wireless transmitters and receivers and particularly to a method and apparatus for antenna beamforming of a multi-input-multi-output (MIMO) transmitter and receiver using orthogonal frequency division multiplexing (OFDM).

The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

In the following description of the embodiments, reference is made to the accompanying drawings that form a part hereof, and in which is shown by way of illustration the specific embodiments in which the invention may be practiced. It is to be understood that other embodiments may be utilized because structural changes may be made without departing from the scope of the present invention.

Figure 1:
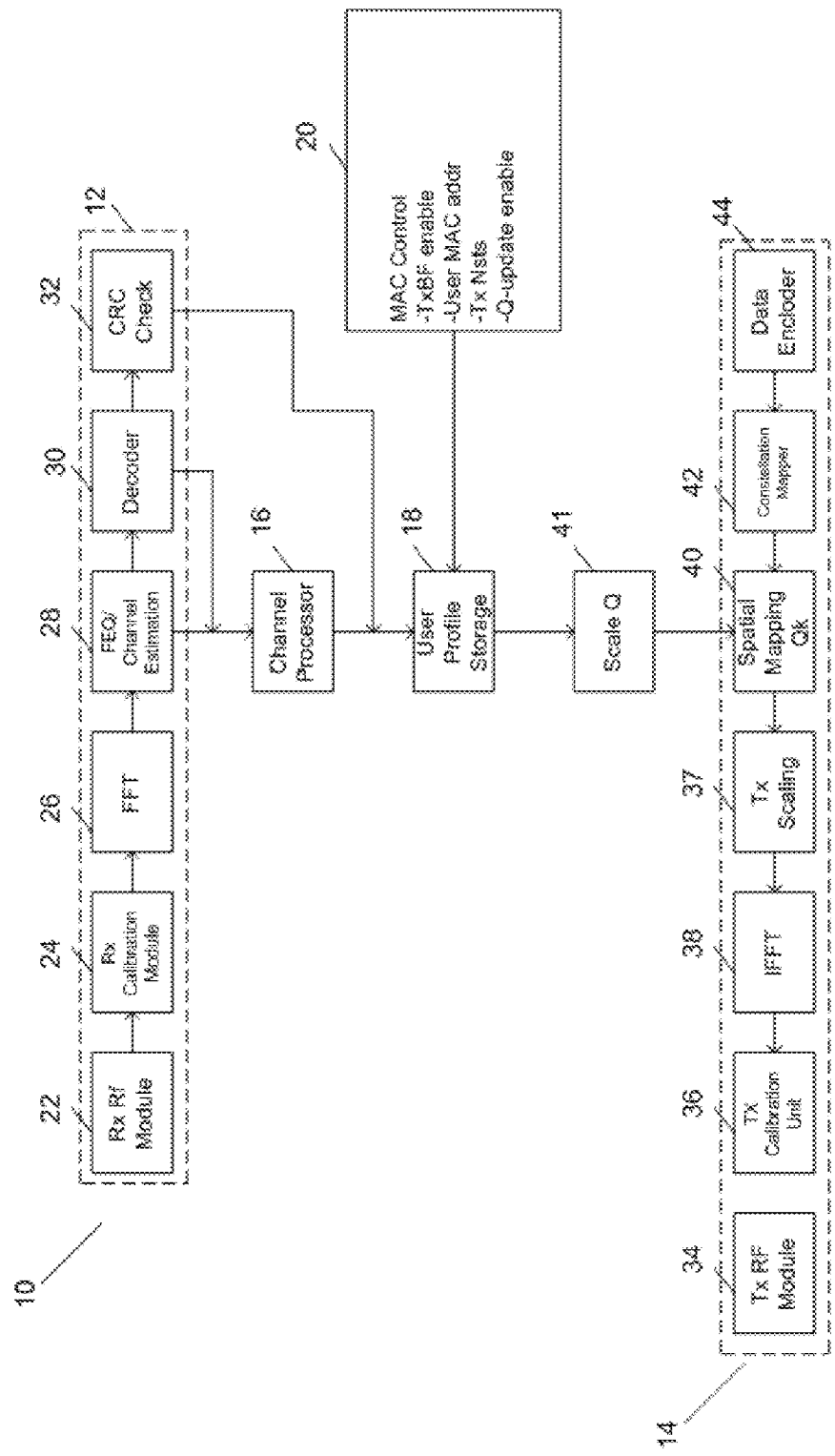
FIG. 1 illustrates a high level block diagram of a universal multi-output (MIMO) transceiver beamforming system which utilizes an embodiment of the present invention.

FIG. 1 illustrates a high level block diagram of a universal multi-output (MIMO) transceiver beamforming system which utilizes an embodiment of the present invention.

Referring now to FIG. 1, a high-level block diagram of a universal multi-input-multi-output (MIMO) transceiver beamforming system 10 is shown, in accordance with an embodiment of the present invention. The system 10 is shown to include a receiver circuit 12, a transmitter circuit 14, a channel processor 16, a user profile storage unit 18 and a multiple access control (MAC) 20, in accordance with an embodiment of the present invention. The circuits 12 and 14 are, at times, referred to as transceivers. A transceiver is for transmission and reception of information, in the form of packets, for example.

The receiver circuit 12 is shown to include a receiver radio frequency (RF) module 22 shown coupled to a receiver calibration module 24, which is, in turn, shown coupled to a fast Fourier transform (FFT) 26, which is in turn shown coupled to a frequency equalizer channel estimation circuit 28, which is shown coupled to a decoder 30, which is shown coupled to a cyclic redundancy code (CRC) check 32.

The transmitter circuit 14 is shown to include a transmitter RF module 34 shown coupled to a transmitter calibration module 36, which is shown coupled to an inverse FFT (IFFT) 38, which is shown coupled to a TX scaling 37. The TX scaling 37 is coupled to a spatial mapping Qk 40 which is shown coupled to a constellation mapper 42. The constellation mapper 42 maps the encoded data from the data encoder 44 to symbol constellation points.

The estimation circuit 28 is further shown to couple the receiver circuit 12 to the channel processor 16, and the spatial mapping Qk 40 is further shown to couple the transmitter circuit 14 to the scale Q 41. The scale Q 41 is coupled to the user profile storage unit 18. The channel processor 16 is further shown coupled to the CRC check 32 and the user profile storage unit 18 is further shown coupled to receive input from the MAC control.

The system 10 of FIG. 1 is typically used to perform OFDM in settings employing MIMO and therefore multiple antennas or antenna arrays. A key feature of the system 10 is that calibration is performed in the time domain thereby avoiding unnecessary use of valuable bandwidth. More specifically, the need for sending calibration information across the network, such as required by systems performing calibration in frequency domain and sending such information with each sub-carrier, is avoided.

In FIG. 1, the various components of the receiver circuit 12 perform various functions to demodulate received signals. The module 22 generally serves to convert an RF signal to baseband and the module 24 performs beamforming calibration. The FFT 26 performs time domain to frequency domain conversion by way of FFT and the circuit 28 generally performs channel estimation. The decoder 30 generally decodes the channel and the check 32 performs redundancy check to reduce errors. Channel estimation by the circuit 28 includes calculation of OFDM channel parameters (or matrix) for each data sub-carrier.

In FIG. 1, the various components of the transmitter circuit 14 perform various functions. The mapper 42 maps the signal to be transmitted to a known constellation and the spatial mapping $Q_k$ 40 spatially maps the output of the mapper 42 (sub-script k is used to indicate that this spatial mapping may in general depend on the tone index k). The mapper 42 receives the encoded data from the encoder 44, which generally consists of a binary convolutional encoder, puncturer and bit interleaver. The IFFT 38 generally performs an IFFT based upon the Tx scaling 37 to convert the output of the spatial mapping $Q_k$ 40 from frequency domain to time domain. Tx scaling as will be described later in some detail is utilized to enhance the performance of the system. The module 36 generally performs calibration on the output of the IFFT 38 and the module 34 generally converts a baseband signal to RF for transmission thereof in a network of devices, an example of which will be shortly presented.

The processor 16 generally determines the best beamforming parameters for each data sub-carrier. The storage unit 18 generally stores the beamforming information for each user of the system 10. Beamforming information is based on the channel coefficients, and is generally stored in matrix form that specifies the best gain and phase directions between each transmitter and receiver antenna. The spatial mapping $Q_k$ 40 generally accepts the scaled user profile information from the unit 18 via scale Q 41, and implements beamforming for each individual data sub-carrier. Scale Q 41 as will be described later in some detail is utilized to enhance the performance of the system. The MAC control 20 generally identifies the intended destination of the packet so that the corresponding user profile information may be retrieved from the unit 18. In doing so, the MAC control 20 performs transmit beamforming enablement, user MAC addressing; transmit N stations and Q updating enablement.

The modules 24 and 36 each generally correct for RF impairments and misalignments introduced by the receiver and transmitter analog circuits, respectively, used in the system 10.

The system 10 is generally employed in a network of devices, in each device transmitting and receiving information in packet form.

Figure 2:
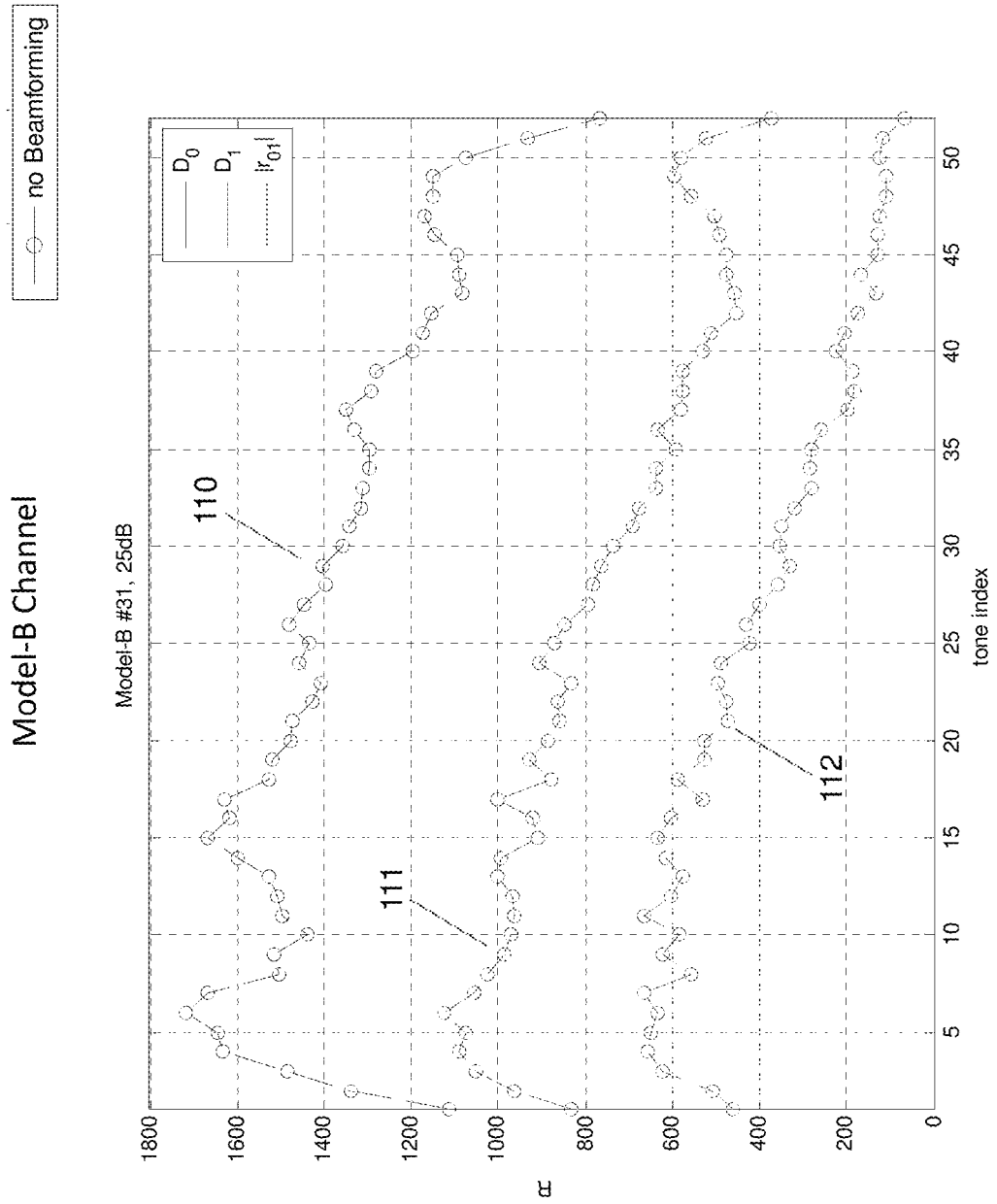
FIG. 2 illustrates a Model-B multipath channel which includes first ($D_0$) and second ($D_1$) data streams and their cross correlation $|r_{01}|$ when the streams are not beamformed.

FIG. 2 illustrates a Model-B multipath channel which includes first and second data streams 110 and 112 and their cross correlation $|r_{01}|$ 111 when the streams 110 and 112 are not beamformed. In this type of channel the data streams have channel nulls (swings from high to low) that are in this instance as much as 12 dB. Furthermore there is a cross correlation problem associated with an unbeamformed multipath channel which is illustrated in FIG. 2. In this embodiment, the received signal to noise ratio (SNR) of data stream D0 is significantly stronger than the received SNR of stream D1. As is seen the cross correlation 111 of the two streams is very close to the received SNR of the weaker stream 112. The cross correlation being so close to the SNR of the weaker stream 111 can adversely affect the overall performance of the system, unless a complicated Rx structure (like MLD) is chosen. To address this issue typically the data streams are beamformed.

Figure 3:
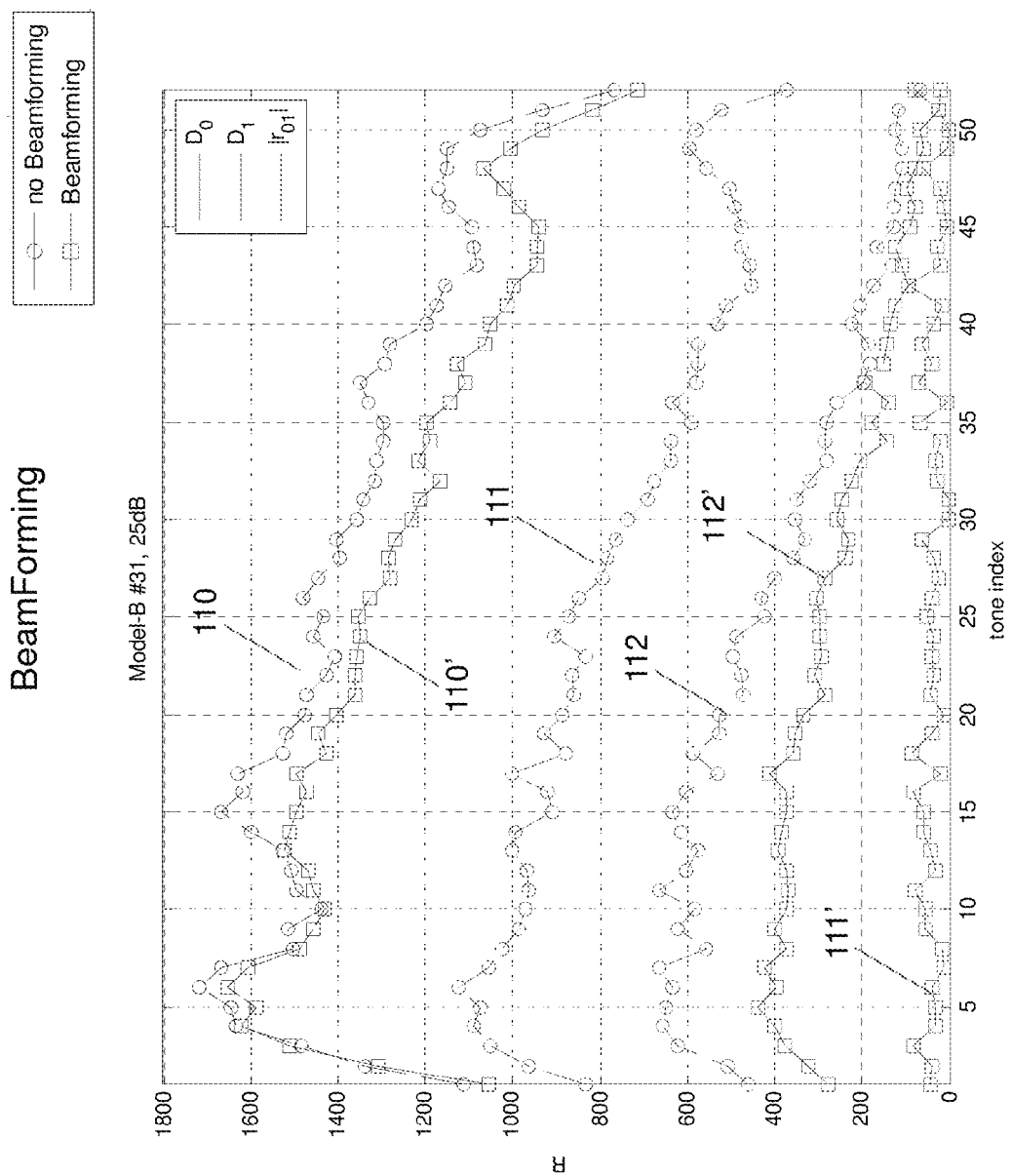
FIG. 3 is a diagram that illustrates the data streams of FIG. 2 after being beamformed.

FIG. 3 is a diagram that illustrates the data streams of FIG. 2 after being beamformed. As is seen, the beamforming removes the cross-correlation 111', but it also significantly reduces the signal strength of the weaker stream 112'. The signal strength of the stronger stream 110 is not significantly affected. Accordingly, what is desired is to strengthen the beamforming signals and make the weaker stream 112' stronger to improve the overall performance of the system.

It has been determined that by scaling the data streams in a particular manner the overall performance of the system is improved. To describe this feature refer now to the following discussion. It has been determined that in beamforming systems that the SNR is proportional to how good or bad the plurality of data streams are relative to each other. That is it is dependent upon whether all of the data streams are above a threshold value. As is seen in FIG. 2, stream 112 is very low and therefore less useful at the decoder 30. What is desired is to make both streams strong enough to be detected by a receiver and arrive at the decoder 30 at similar levels, especially when both streams have the same modulation and therefore similar minimum SNR requirements.

Accordingly a system and method in accordance with the present invention provides scaled beam forming to enhance system performance. A system that utilizes a scaled beam forming in accordance with the present invention can take the form of an entirely hardware implementation, an entirely software implementation, or an implementation containing both hardware and software elements. In one implementation, the scaled beam forming is implemented in software, which includes, but is not limited to, application software, firmware, resident software, microcode, etc.

Furthermore, the scaled beam forming can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include DVD, compact disk-read-only memory (CD-ROM), and compact disk-read/write (CD-R/W). To describe the features of the present invention in more detail, refer now to the following description in conjunction with the accompanying figures.

Figure 4:
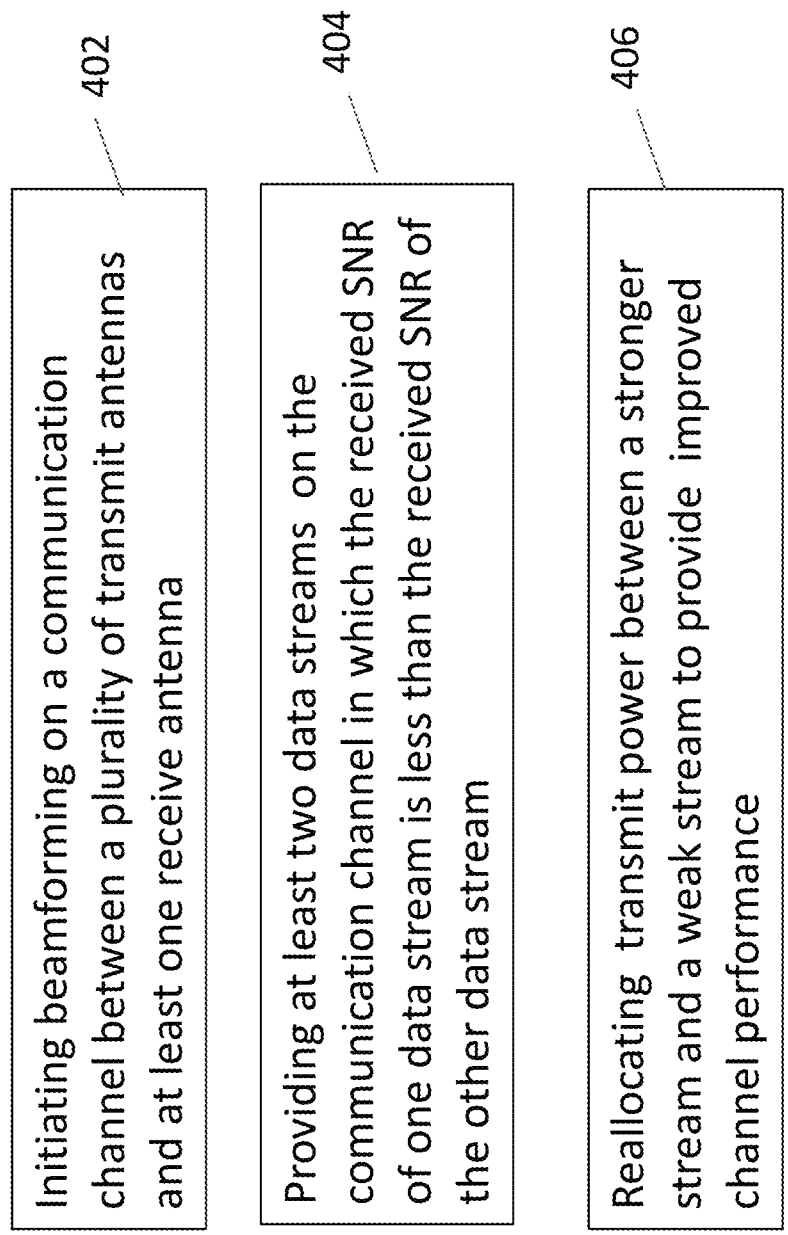
FIG. 4 is a flowchart of a scaled beamforming process in accordance with an embodiment.

FIG. 4 is a flowchart of a scaled beamforming process in accordance with an embodiment. First, beamforming is initiated on a communication channel between a plurality of transmit antennas and at least one receive antenna, via step 402. Next, at least two data streams are provided on the communication channel in which a received signal to noise ratio (SNR) of one of the at least two data streams is weaker than a received SNR of the other of the two data streams, via step 404. Thereafter the transmit power between a stronger stream and a weak stream of the at least two data streams is reallocated to provide improved channel performance, via step 406.

Figure 5:
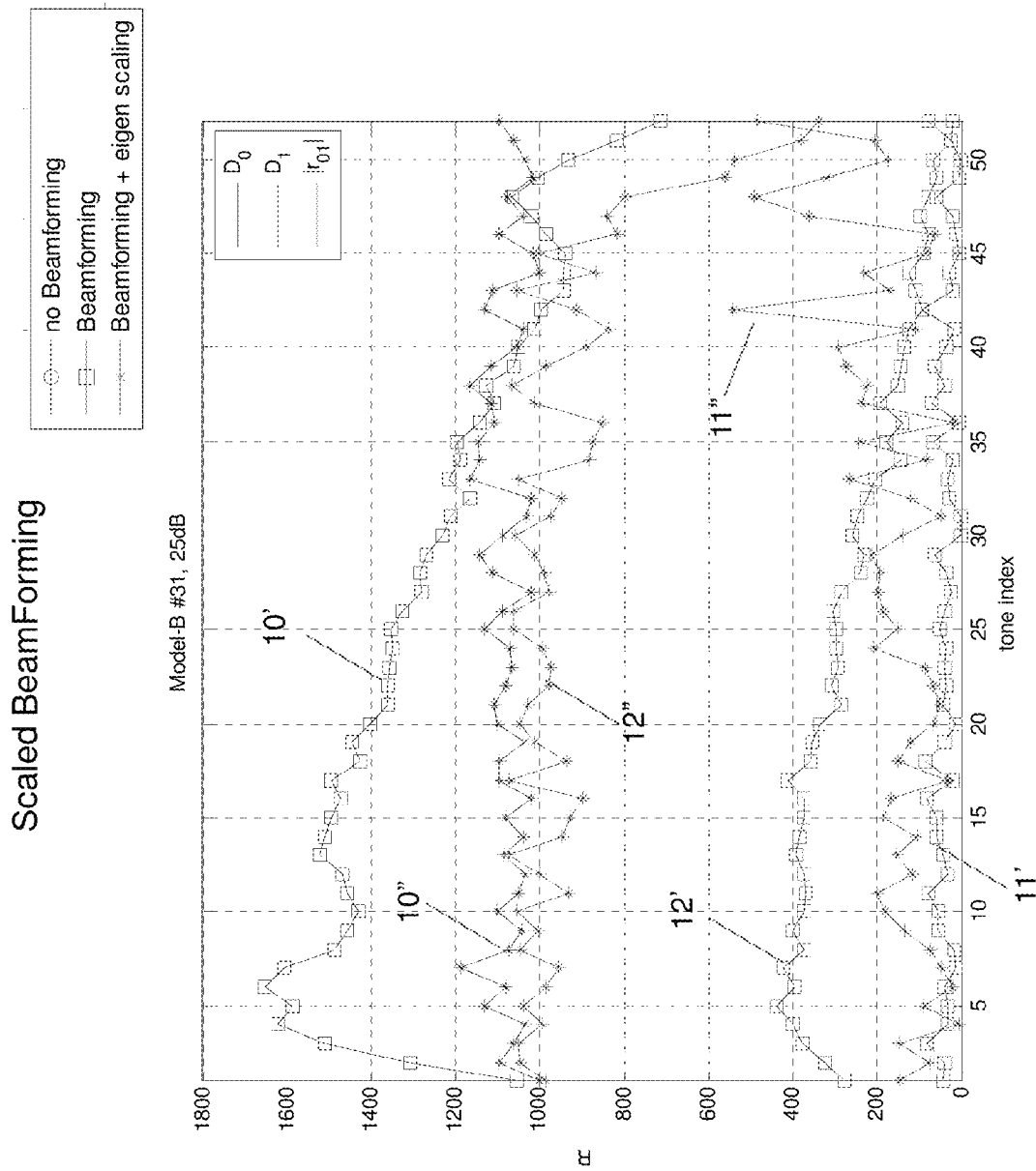
FIG. 5 is a diagram illustrates the results of scaled beamforming of the two data streams to provide enhanced performance.

FIG. 5 is a diagram illustrates the results of scaled beamforming of the two data streams 110' and 112' to provide enhanced performance. As is seen, a system and method in accordance with the present invention provides scaled beamforming that equalizes the Eigen-mode, because (1) cross-correlation remains ~0; (2) $D_0/D_1$~1, (3) nulls are minimal; and (4) close performance range is improved. In addition, throughput stability is also increased.

Figure 6:
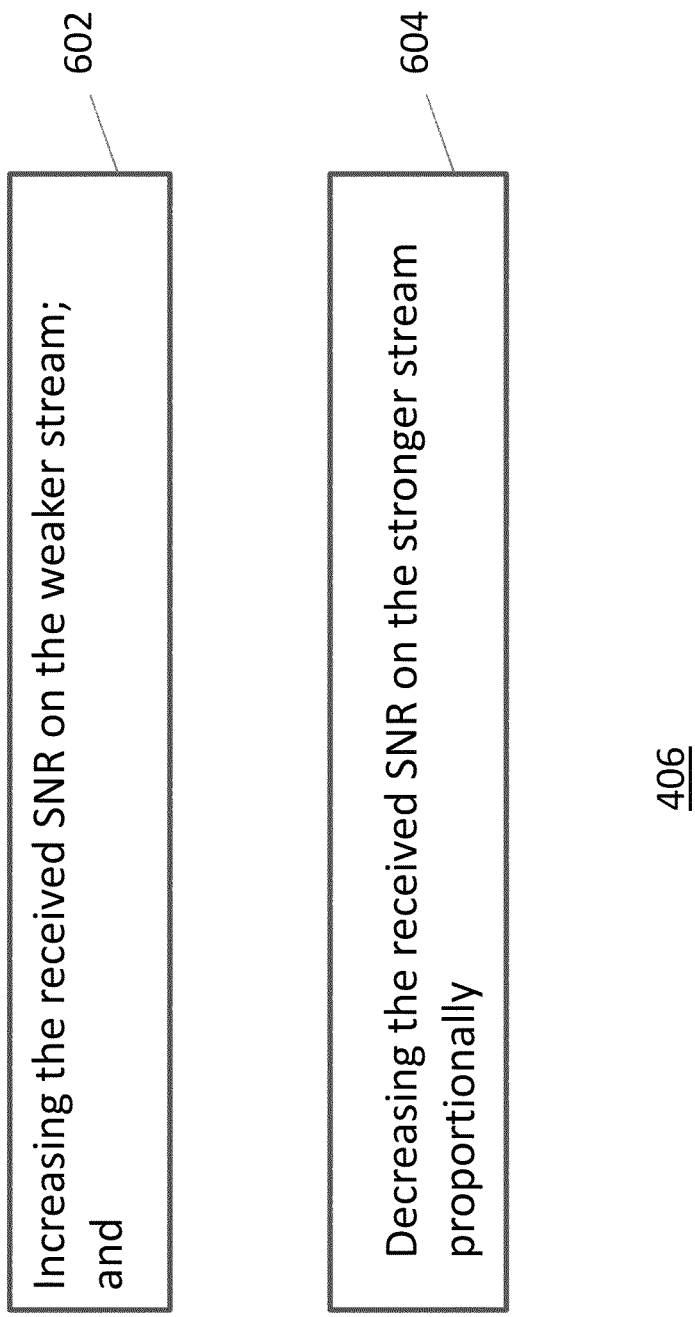
FIG. 6 is a flowchart of one embodiment of a reallocation process in accordance with the present invention.

The reallocation of transmit power between the stream with the stronger received SNR and the stream with the weaker received SNR is a critical feature of the present invention. FIG. 6 is a flowchart of one embodiment of a reallocation process in accordance with the present invention. In such a process, the received SNR on the weaker stream is increased, via step 602 and the received SNR on the stronger stream is proportionally decreased, via step 604. For example if the received SNR on the weaker stream is increased by a predetermined amount, the received SNR on the stronger stream is decreased by an amount in which the resultant SNRs on both data streams is substantially the same. It is possible to increase on of the received SNR because at close range the transmit power can be substantially increased without affecting the performance of the system.

It is desirable to scale the data streams on a per tone basis to further enhance the performance of the system. In so doing the shape of the data stream can be adjusted as well as its position. This procedure is more relevant to an implicit beamforming system where SNR is available per tone, as a part of the CSI. To describe the reallocation process for per tone scaling refer now to the following description.

Figure 7:
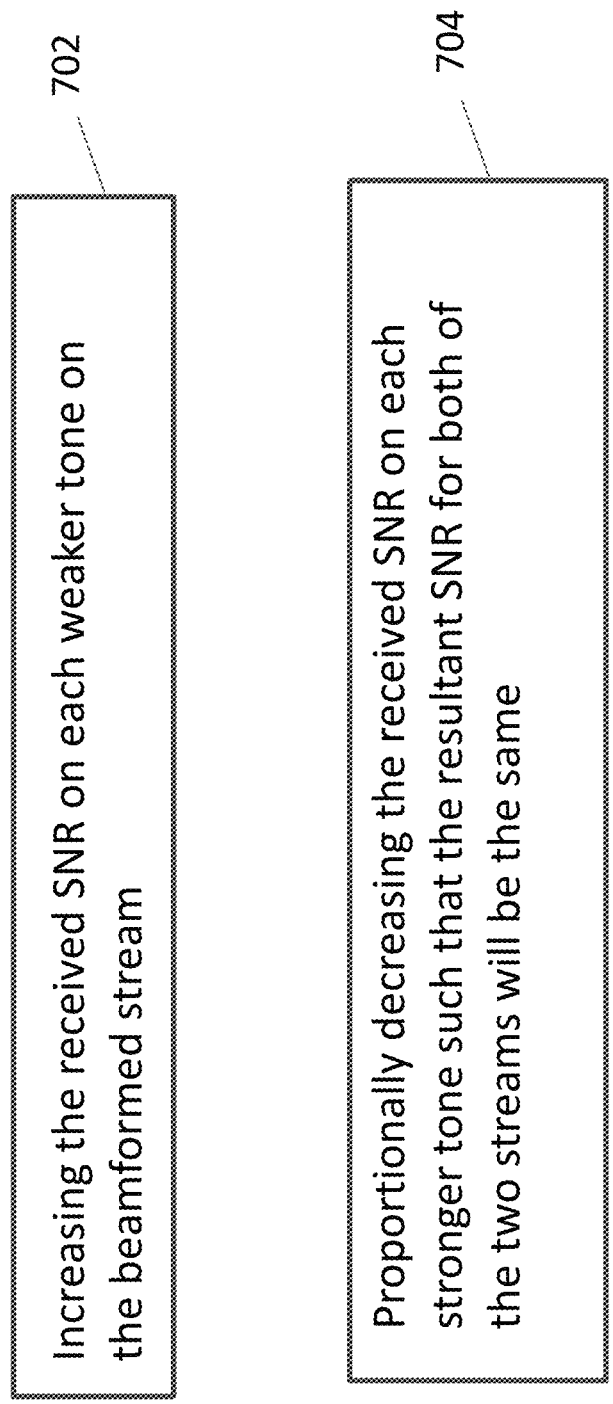
FIG. 7 is a flowchart of reallocation process for per tone scaling.

FIG. 7 is a flowchart of reallocation process for per tone scaling. In such a process, the received SNR on each weaker tone on the beamformed stream is increased, via step 702 and the received SNR on each stronger tone of the beamformed stream is proportionately decreased, via step 704 such that the resultant SNR from both of the two beamformed streams will be substantially the same, across all the OFDM tones. Therefore the shape of each stream can be adjusted.

Figure 8:
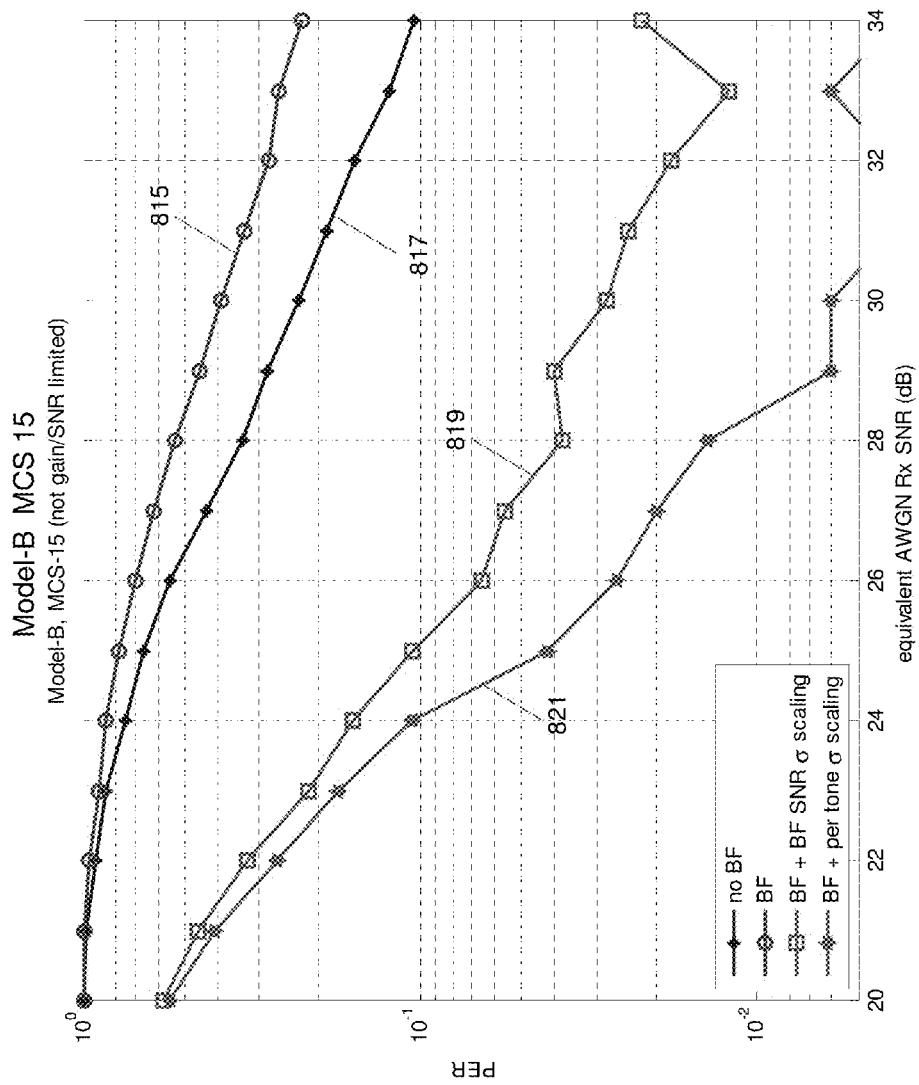
FIG. 8 illustrates two streams in a Model-B MCS 15 environment before and after beam scaling.

FIG. 8 illustrates two streams in a Model-B MCS 15 environment before and after per-tone beam scaling. As is seen, with per tone scaling better received data streams can be provided.

Although these scaling techniques work effectively there are some constraints. Principally beam forming may overload the transmit chains. Accordingly there may be a need to rescale the received SNRs to limit the power output.

There are two use cases, one is if there is only one data stream and multiple transmit antennas and the other is multiple data streams and multiple transmit antennas.

One Data Stream/Multiple Transmit Antennas

If there is only one data stream and multiple transmit antenna only the phase of the data stream matters. In this case each transmit chain can be increased to full transmit power. Tones below a threshold are set to 0 to avoid possible noise amplification.

Multiple Data Streams/Multiple Transmit Antennas

If there are multiple streams, if one the transmit chain exceeds the power requirements of the RF chain, then each stream transmit power must be reduced by the same amount. Since the transmit antennas are at close range this reduction in power does not significantly affect performance of the system.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for beamforming in a wireless communication system, the system comprising a plurality of transmit antennas for a transmitter and at least one receive antenna of a receiver, the method comprising:

initiating beamforming on a communication channel between the plurality of transmit antennas and the at least one receive antenna; the communication channel including two data streams;

reallocating the transmit power among tones of a data stream in the two data streams such that the received SNR on each weaker tone of the beamformed data stream is increased and the received SNR on each stronger tone of the beamformed data stream is proportionately decreased such that the resultant SNR on all tones of the beamformed data stream will be substantially same;

determining whether the transmit power of at least one of the two scaled beamformed streams is too high for the receiver; and if the transmit power is too high;

reducing the transmit power of both scaled beamformed streams by the same amount to prevent overload of the system.

2. The method of claim 1, the received SNR on one of the two data streams is weaker than the received SNR of the other data stream; the method further comprises: reallocating the transmit power between the stronger stream and the weaker stream such that the received SNR on the beamformed weaker stream is increased and the received SNR on the stronger beamformed stream is proportionately decreased such that the resultant SNR from both of the two beamformed streams will be substantially same.

3. The method of claim 1, wherein the communication channel is a multipath channel.

4. The method of claim 3, wherein the multipath channel is a Model-B channel.

5. A transmitter comprising;

a plurality of transmit antennas for providing two data streams to at least one receive antenna of a receiver;

a first circuit for initiating beamforming on a communication channel between the plurality of transmit antennas and the at least one receive antenna; the communication channel including two data streams;

a second circuit for reallocating the transmit power among tones of a data stream in the two data streams such that the received SNR on each weaker tone of the beamformed data stream is increased and the received SNR on each stronger tone of the beamformed data stream is decreased such that resultant SNR on all tones of the beamformed data stream will be substantially same; and a fourth circuit for determining whether the transmit power of at least one of the two scaled beamformed streams is too high for the receiver; and if the transmit power is too high, for reducing the transmit power of both beamformed streams by the same amount to prevent overload of the system.

6. The transmitter of claim 5, the received SNR on one of the two data streams is weaker than the received SNR on the other of the two data streams; the second circuit is further used for optimizing the transmit power between the stronger stream and the weaker stream such that the received SNR on the beamformed weaker stream is increased and the received SNR on the stronger beamformed stream is proportionately decreased such that the resultant received SNR from both of the two beamformed streams will be substantially same.

7. The transmitter of claim 5, wherein the communication channel is a multipath channel.

8. A computer program product stored on a computer usable medium, comprising: computer readable program means for causing a computer to control an execution of an application to perform for a method for beamforming in a wireless communication system, the wireless communication system comprising at least two transmit antennas for a transmitter and at least one receive antenna for a receiver, the application for:

initiating beamforming on a communication channel between the plurality of transmit antennas and the at least one receive antenna; the communication channel including two data streams;

reallocating the transmit power among tones of a data stream in the two data streams such that the received SNR on each weaker tone of the beamformed data stream is increased and the received SNR on each stronger tone of the beamformed data stream is decreased such that the resultant SNR on all tones of the beamformed data stream will be substantially same;

determining whether the transmit power of at least one of the two scaled beamformed streams is too high for the receiver; and if the transmit power is too high;

reducing the transmit power of both scaled beamformed streams by the same amount to prevent overload of the system.

9. The computer program product of claim 8, the received SNR on one of the two data streams is weaker than the received SNR of the other data stream; the application further for reallocating the transmit power between the stronger stream and the weaker stream such that the received SNR on the beamformed weaker stream is increased and the received SNR on the stronger beamformed stream is proportionately decreased such that the resultant power output from both of the two beamformed streams will be substantially same.

10. The computer program product of claim 8, wherein the communication channel is a multi-path channel.

* * * * *